July 26, 1955  C. F. CASAS  2,713,750
DEVICE FOR PROTECTING GROWING CROPS
Filed Feb. 1, 1954

INVENTOR
CHARLES F. CASAS
BY
ATTORNEYS

United States Patent Office 2,713,750
Patented July 26, 1955

2,713,750

DEVICE FOR PROTECTING GROWING CROPS

Charles F. Casas, South Gate, Calif., assignor to Certified Paper Converting Company, a corporation of California Application February 1, 1954, Serial No. 407,414

1 Claim. (Cl. 47—26)

This invention has to do with devices for protecting growing crops and relates more particularly to an economical protective sheet which is so arranged and reinforced that it may be supported along rows of growing produce and the like in a manner to protect the plants from unfavorable atmospheric conditions.

In some areas the climatic conditions are such that produce crops may be grown in the winter time, although in such areas the nights are frequently cold enough to freeze the plants and produce. This requires that protection be provided for the plants and obviously any protecting device must be sufficiently economical to render it practicably usable. It has been proposed to use sheets of paper surrounding the plants and held in position by posts or stakes. However, such paper sheets of which I am aware have been unsuccessful for the reason that they tear so easily, are easily destroyed by wind, and are accidentally torn by workmen endeavoring to obtain access to the protected plants. Attempts at reinforcing such sheets have been unsuccessful because it has not been deemed possible to secure the reinforcing means in or to the sheets in a way which would prevent the means from being easily pulled or torn from the sheets.

It is therefore an object of my invention to provide a device for protecting growing crops which is not only economical enough to render it practicably usable but which is also highly effective.

More specifically, it is an object of my invention to provide a protective sheet which may be made of paper since it is reinforced in a novel manner to enable the sheet to withstand abuse without becoming torn and to prevent the reinforcing means from being accidentally pulled or removed from the sheet.

Another more specific objece of my invention is to provide, in such a protective sheet, novel reinforcing means.

It is a further object of my invention to provide a protective sheet of this character which may be easily and securely mounted on supporting stakes or posts along rows of growing produce and the like.

Other objects and advantages will become obvious from the following detailed description of a presently preferred embodiment of my invention, for which purpose I shall refer to the accompanying drawings, wherein:

Fig. 1 shows my sheet reinforcing member;

Figs. 2 and 3 are enlarged sections taken on lines 2—2 and 3—3, respectively, of Fig. 1;

I wish it understood that, except as may appear from the appended claim, I do not limit the broader scope of my invention to the details of construction illustrated in said drawings and now to be described.

Figure 5:
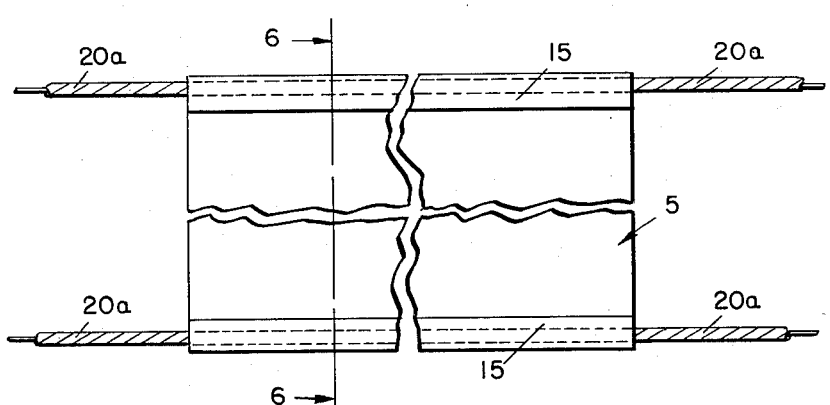
Fig. 5 is a side elevation of my protective sheet.
Figure 6:
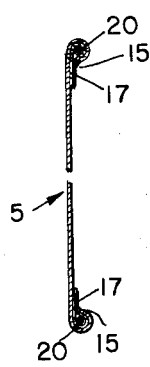
Fig. 6 is a section taken on line 6—6 of Fig. 5.

Referring now to the drawings, my protective sheet is generally denoted by the numeral 5. It is my preference that the sheet be composed of creped, wet-strength kraft paper, although other papers and materials may be used in carrying out my invention. The sheet has its top and bottom side marginal portions 15 folded over upon the body of the sheet, as best shown in Fig. 5. However, before being folded in this manner, the marginal portions 15 are coated with a suitable adhesive 17 and a reinforcing member generally denoted by the numeral 20 is placed along the intersection of each of the folds with the body of the sheet. Thus the reinforcing members 20 become adhered to the sheet and the folded-over marginal portions become bonded to the body of the sheet, confining the reinforcing members 20 within the respective folds.

Figure 9:
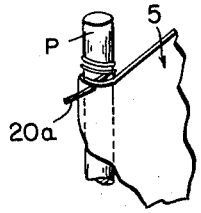
Fig. 9 is a fragmentary perspective view showing the manner in which my protective sheet is secured at its ends to supporting posts.

Preferably the ends 20a of the reinforcing members 20 project from the ends of each fold so that they may be readily tied to a supporting post P, as shown in Fig. 9.

An important feature of my invention resides in the construction of the reinforcing members 20 and the manner in which they are incorporated in the marginal folds of the sheet.

Figure 1:
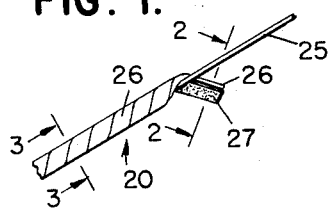
Figure 2:
Figure 3:
Figure 4:
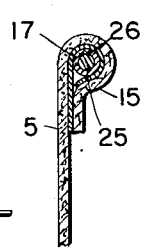
Fig. 4 is an enlarged fragmentary section showing how my reinforcing member is incorporated in a protective sheet.

As best shown in Figs. 1, 2, and 3, each reinforcing member consists of a length of flexible wire 25 about which a length of paper sheathing 26 is spirally wound after the paper has had its under surface coated with a suitable adhesive 27 to effect a bond between the wire and the sheathing. It is my preference that the paper sheathing have an uncalendered outer surface to enhance its ability to become securely bonded to the sheet. While I prefer to utilize wire for the core of the reinforcing member, it is possible to substitute for the wire a string having adequate strength.

Thus the wire 25 becomes securely bonded to the spirally disposed sheathing 26 so that the wire cannot be pulled axially out of the sheathing and the sheathing becomes securely bonded to the sheet 5 within the folds 15. Of course the sheathing 26 could be made of a cloth fabric or other suitable material, although I find uncalendered paper to be highly economical, as well as ideally efficient for the purposes of my invention.

Figure 7:
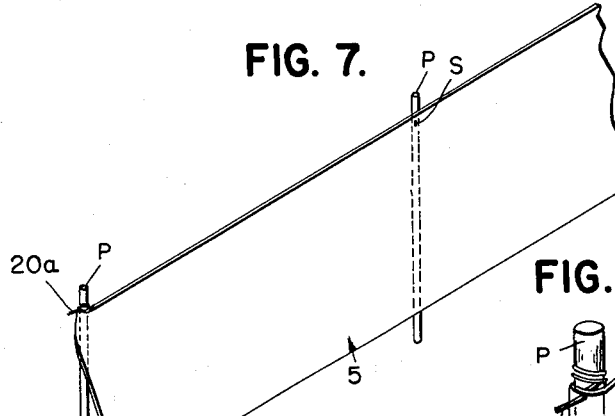
Fig. 7 is a perspective view showing how my protective sheet may be mounted on supporting posts.
Figure 8:
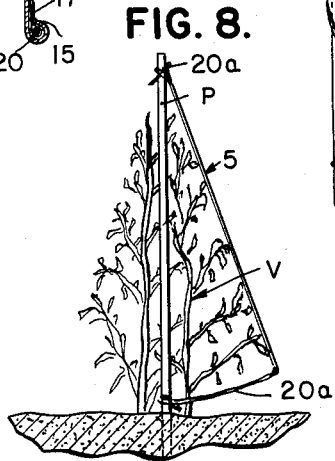
Fig. 8 is an end view of a row of growing plants protected by my sheets.

In Figs. 7-9, I show typical installations of my protective sheet. First, posts P are driven into the ground at spaced points along a row of plants V, after which a length of my protective sheet is mounted by having the projecting ends 20a of the reinforcing members tied to the end stakes and by using conventional staples S to secure the sheets to the intermediate posts, such staples being disposed astride the reinforcing member in the sheet.

The bottom edge of the sheet may hang rather loosely so that it may conform to the outline of the plants V, the projecting ends 20a of the bottom reinforcing members being tied to the posts adjacent the ground, as shown in Fig. 7, leaving a relatively long length of the reinforcing member between the post and the bottom marginal portion of the sheet. In some cases, the sheet 5 need only be placed along one side of the row of plants V, as shown in Fig. 8.

From the foregoing description it will be apparent that I have provided a protective sheet which is not only highly economical to produce but which may be used with the same or greater efficiency than more complicated and costly plant protective devices. By my novel reinforcing means and the manner in which it is incorporated in the sheet, the reinforcing means becomes, in effect, permanently integrated with the sheet to enable the sheet to have a long life in the field.

I claim:

A protective device adapted to be anchored to supporting stakes alongside a row of growing plants to protect them from wind, comprising a rectangular sheet of flexible paper having its side marginal portions folded over and adhered to the underlying surface of said sheet throughout the length thereof whereby to define a pair of parallel sleeve-like folds, and a reinforcing member mounted in, extending the length of, and projecting at its ends from the ends of each of said folds whereby to provide ties for anchoring the same to said stakes; each of said reinforcing members comprising a length of flexible wire having a flexible sheathing of uncalendered paper spirally wound thereabout and adhered thereto and to the said fold through which it extends.

References Cited in the file of this patent

UNITED STATES PATENTS

| | | |
|---|---|---|
| 1,400,078 | Kempton | Dec. 13, 1921 |
| 1,905,392 | Freydberg | Apr. 25, 1933 |
| 2,015,471 | Genuit | Sept. 24, 1935 |

FOREIGN PATENTS

| | | |
|---|---|---|
| 12,689 | France | Aug. 12, 1910 |
| | (1st Addition to No. 403,883) | |
| 765,392 | France | Mar. 26, 1934 |
| 1,007,056 | France | Feb. 6, 1952 |